United States Patent
Ye et al.

(10) Patent No.: US 11,909,042 B2
(45) Date of Patent: Feb. 20, 2024

(54) POSITIVE ELECTRODE ENABLING FAST CHARGING

(71) Applicant: Medtronic, Inc., Minneapolis, MN (US)

(72) Inventors: Hui Ye, Maple Grove, MN (US); Prabhakar A. Tamirisa, Brooklyn Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 407 days.

(21) Appl. No.: 17/118,148

(22) Filed: Dec. 10, 2020

(65) Prior Publication Data

US 2022/0190330 A1    Jun. 16, 2022

(51) Int. Cl.
*H01M 4/525* (2010.01)
*H01M 4/62* (2006.01)
*H01M 10/0525* (2010.01)
*H01M 10/44* (2006.01)

(52) U.S. Cl.
CPC ........... *H01M 4/525* (2013.01); *H01M 4/623* (2013.01); *H01M 4/625* (2013.01); *H01M 10/0525* (2013.01); *H01M 10/44* (2013.01)

(58) Field of Classification Search
CPC ............. H01M 10/0525; H01M 10/44; H01M 2004/028; H01M 4/131; H01M 4/485; H01M 4/525; H01M 4/623; H01M 4/625; Y02E 60/10
See application file for complete search history.

(56) References Cited

U.S. PATENT DOCUMENTS

| | | | |
|---|---|---|---|
| 7,635,541 B2 | 12/2009 | Scott et al. | |
| 7,682,745 B2 | 3/2010 | Howard et al. | |
| 7,811,705 B2 | 10/2010 | Scott et al. | |
| 7,875,389 B2 | 1/2011 | Scott et al. | |
| 7,927,742 B2 | 4/2011 | Scott et al. | |
| 8,105,714 B2 | 1/2012 | Schmidt et al. | |
| 8,205,714 B2 | 6/2012 | Schuermans et al. | |
| 8,383,269 B2 | 2/2013 | Scott et al. | |

FOREIGN PATENT DOCUMENTS

| | | | | |
|---|---|---|---|---|
| CN | 105552355 | | 5/2016 | |
| CN | 106848306 | | 6/2017 | |
| CN | 109786810 A | * | 5/2019 | ........ H01M 10/0525 |
| EP | 2919298 | | 9/2015 | |
| WO | 2016/080539 | | 5/2016 | |

OTHER PUBLICATIONS

Machine translation CN109786810A (Year: 2019).*
International Search Report and Written Opinion for PCT/US2021/062086, dated Apr. 4, 2022; 9 pages.

* cited by examiner

*Primary Examiner* — Victoria H Lynch
(74) *Attorney, Agent, or Firm* — Mueting Raasch Group

(57) ABSTRACT

A rechargeable lithium-ion battery includes a positive electrode enabling fast charging. A negative electrode has a first active material including $Li_4Ti_5O_{12}$. A positive electrode includes a second active material including $LiCoO_2$. The positive electrode further includes a carbon conductive agent and a binder. A weight ratio of the carbon conductive agent to the binder is in a range of about 2:3 to about 3:2.

18 Claims, 10 Drawing Sheets

POSITIVE ELECTRODE ENABLING FAST CHARGING

FIELD

The present disclosure relates generally to the field of rechargeable lithium-ion batteries or cells.

BACKGROUND

Lithium-ion batteries or cells (i.e., rechargeable or "secondary" batteries) include one or more positive electrodes, one or more negative electrodes, and an electrolyte provided within a case or housing. Separators made from a porous polymer or other suitable material may also be provided intermediate or between the positive and negative electrodes to prevent direct contact between adjacent electrodes. The positive electrode includes a current collector having an active material provided thereon, and the negative electrode includes a current collector having an active material provided thereon.

SUMMARY

Embodiments described herein involve a rechargeable lithium-ion battery comprising a negative electrode comprising a first active material comprising $Li_4Ti_5O_{12}$. A positive electrode comprises a second active material comprising $LiCoO_2$. The positive electrode further comprises a carbon conductive agent and a binder. A weight ratio of the carbon conductive agent to the binder is in a range of about 2:3 to about 3:2.

Embodiments described herein involve a rechargeable lithium-ion battery comprising a negative electrode comprising a first active material comprising $Li_4Ti_5O_{12}$. A positive electrode comprises a second active material comprising $LiCoO_2$. The positive electrode further comprises a carbon conductive agent comprising a weight ratio of carbon black and graphite in a range of about 1:9 to about 9:1. The positive electrode further comprises a binder, wherein a weight ratio of the carbon conductive agent to the binder is in a range of about 2:3 to about 3:2.

Embodiments described herein involve a rechargeable lithium-ion battery comprising a negative electrode comprising a first active material comprising $Li_4Ti_5O_{12}$. A positive electrode comprises a second active material comprising $LiCoO_2$. The positive electrode further comprises a carbon conductive agent. The positive electrode further comprises a binder. A weight ratio of the carbon conductive agent, C, to the binder, PVDF, wherein a weight ratio of the carbon conductive agent, C, to the binder, PVDF is characterized by:

$$12.5 - 362.6 \cdot C + 356.1 \cdot PVDF + (C - 0.020) \cdot ((PVDF - 0.023) \cdot (-39629.6) < 15 \text{ (mins)};$$ (1.)

$$623.34 - 1251.85 \cdot C - 1577.78 \cdot PVDF + 7407.41 \cdot (C - 0.0195) \cdot ((PVDF - 0.023) > 550 \text{ (mAh)};$$ (2.)

$$0.164 + 4.82 \cdot C - 8.47 \cdot PVDF - 664.4 \cdot (C - 0.0195) \cdot ((PVDF - 0.023) < 0.2 (\%); \text{ and}$$ (3.)

$$-0.278 - 7.648 \cdot C + 66.78 \cdot PVDF + 623.34 - 1251.853592.59 \cdot (C - 0.0195) \cdot ((PVDF - 0.023) > 0.5 \text{ (lbs)}.$$ (4.)

Advantages and additional features of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative and are not intended to limit the scope of the claims in any manner.

BRIEF DESCRIPTION OF THE DRAWINGS

The following detailed description of specific embodiments of the present disclosure can be best understood when read in conjunction with the following drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Reference will now be made in greater detail to various embodiments of the subject matter of the present disclosure, some embodiments of which are illustrated in the accompanying drawings. Like numbers used in the figures refer to like components and steps. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

Figure 1:
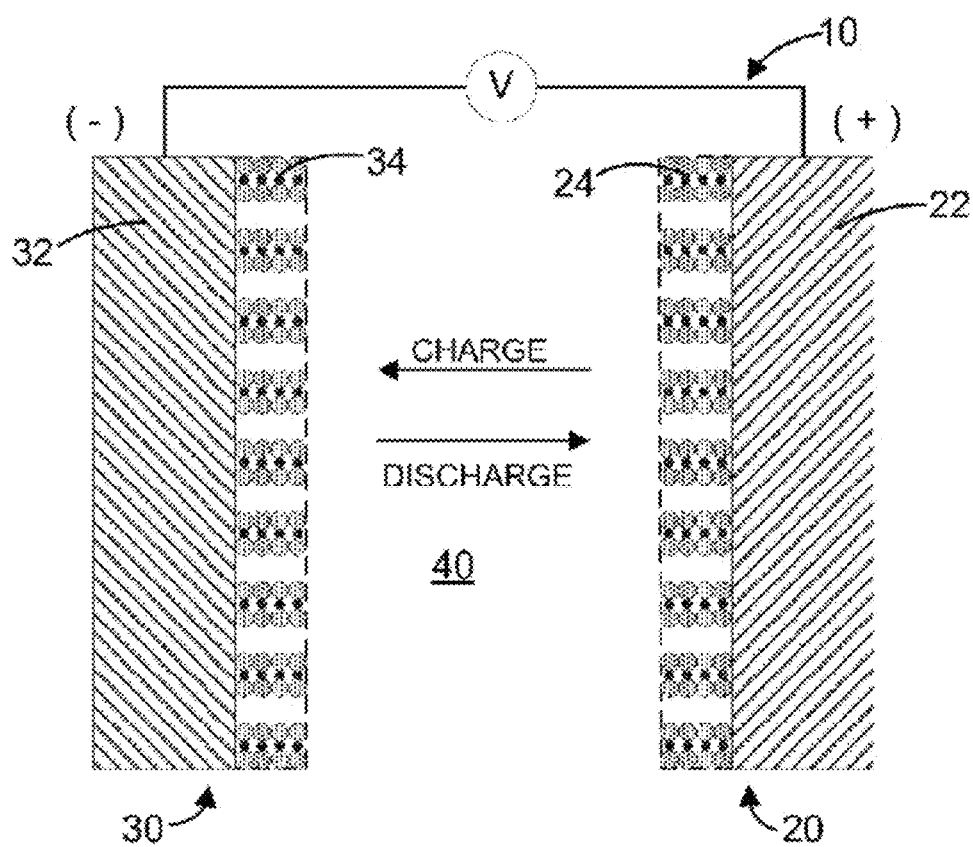
FIG. 1 shows a schematic representation of a portion of a lithium-ion battery in accordance with embodiments described herein.

FIG. 1 shows a schematic representation of a portion of a lithium-ion battery 10 such as that described herein. The battery 10 includes a positive electrode 20 that includes a positive current collector 22 and a positive active material 24, a negative electrode 30 that includes a negative current collector 32 and a negative active material 34, an electrolyte material 40, and a separator (e.g., a polymeric microporous separator, not shown) provided intermediate or between the positive electrode 20 and the negative electrode 30. The electrodes 20, 30 may be provided as relatively flat or planar plates or may be wrapped or wound in a spiral or other configuration (e.g., an oval configuration). The electrode may also be provided in a folded configuration.

During charging and discharging of the battery 10, lithium ions move between the positive electrode 20 and the negative electrode 30. For example, when the battery 10 is discharged, lithium ions flow from the negative electrode 30 to the positive electrode 20. In contrast, when the battery 10 is charged, lithium ions flow from the positive electrode 20 to the negative electrode 30.

Once assembly of the battery is complete, an initial charging operation (referred to as a "formation process') may be performed. During this process, a stable Solid-electrolyte inter-phase (SEI) layer is formed at the negative electrode and also possibly at the positive electrode. These SEI layers act to passivate the electrode-electrolyte interfaces as well as to prevent side-reactions thereafter.

Figure 2:
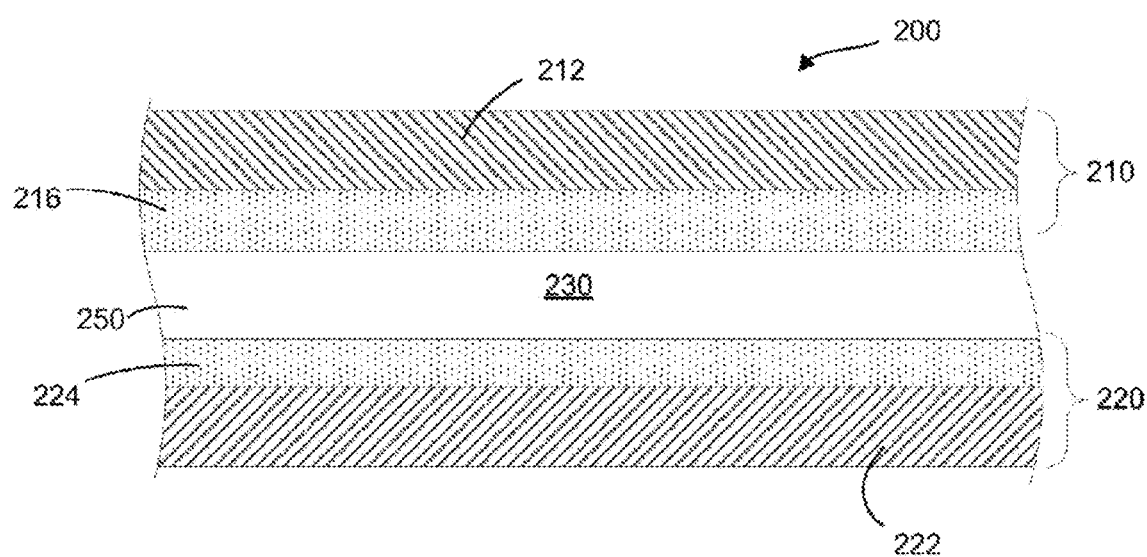
FIG. 2 is a schematic cross-sectional view of a portion of a battery or cell according to an exemplary embodiment that includes at least one positive electrode and at least one negative electrode in accordance with embodiments described herein.

FIG. 2 is a schematic cross-sectional view of a portion of a battery or cell 200 according to an exemplary embodiment that includes at least one positive electrode 210 and at least one negative electrode 220. The size, shape, and configuration of the battery may be selected based on the desired application or other considerations. For example, the electrodes may be flat plate electrodes, wound electrodes (e.g., in a jellyroll, folded, or other configuration), or folded electrodes (e.g., Z-fold electrodes). According to other exemplary embodiments, the battery may be a button cell battery, a thin film solid state battery, or another type of lithium-ion battery.

The battery case or housing (not shown) is formed of a metal or metal alloy Such as aluminum or alloys thereof, titanium or alloys thereof, stainless steel, or other suitable materials. According to another exemplary embodiment, the battery case may be made of a plastic material or a plastic-foil laminate material (e.g., an aluminum foil provided intermediate a polyolefin layer and a nylon or polyester layer).

An electrolyte is provided intermediate or between the positive and negative electrodes to provide a medium through which lithium ions may travel. According to an exemplary embodiment, the electrolyte may be a liquid (e.g., a lithium salt dissolved in one or more non-aqueous solvents). According to an exemplary embodiment, the electrolyte may be a mixture of ethylene carbonate (EC), ethylmethyl carbonate (EMC) and a 1.1 M salt of $LiPF_6$. According to another exemplary embodiment, an electrolyte may be used that uses constituents that may commonly be used in lithium batteries (e.g., propylene carbonate, dimethyl carbonate, vinylene carbonate, lithium bis-oxalatoborate salt (sometimes referred to as LiBOB), etc.). It should be noted that according to an exemplary embodiment, the electrolyte does not include a molten salt.

Various other electrolytes may be used according to other exemplary embodiments. According to an exemplary embodiment, the electrolyte may be a lithium salt dissolved in a polymeric material Such as poly(ethylene oxide) or silicone. According to another exemplary embodiment, the electrolyte may be an ionic liquid such as N-methyl-N-alkylpyrroli dinium bis(trifluoromethanesulfonyl)imide Salts. According to another exemplary embodiment, the electrolyte may be a 3.7 mixture of ethylene carbonate to ethylmethyl carbonate (EC:EMC) in a 1.1 M salt of $LiPF_6$. According to another exemplary embodiment, the electrolyte may include a polypropylene carbonate solvent and a lithium bis-oxalatobo rate salt. According to other exemplary embodiments, the electrolyte may comprise one or more of a PVDF copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, poly ethylene oxide (PEO), a glass ceramic electrolyte, phosphate glasses, lithium conducting glasses, and lithium conducting ceramics, among others.

A separator 250 is provided intermediate or between the positive electrode 210 and the negative electrode 220. According to an exemplary embodiment, the separator 250 is a polymeric material Such as a polypropylene/polyethelene copolymer or another polyolefin multilayer laminate that includes micropores formed therein to allow electrolyte lithium ions to flow from one side of the separator to the other.

The positive electrode 210 includes a current collector 212 made of a conductive material such as a metal. According to an exemplary embodiment, the current collector 212 comprises aluminum or an aluminum alloy.

The current collector 212 has a layer of active material 216 provided thereon (e.g., coated on the current collector). While FIG. 2 shows that the active material 216 is provided on only one side of the current collector 212, it should be understood that a layer of active material similar or identical to that shown as active material 216 may be provided or coated on both sides of the current collector 212.

According to an exemplary embodiment, the active material 216 is a material or compound that includes lithium. The lithium included in the active material 216 may be doped and undoped during discharging and charging of the battery, respectively. According to an exemplary embodiment, the active material 216 is lithium cobalt oxide ($LiCoO_2$). According to exemplary embodiments, the active material may be provided as one or more additional materials. For example, the positive electrode may comprise one or more of Ni—Mn—Co— oxide and/or Ni—Co—Al oxide.

A binder material may also be utilized in conjunction with the layer of active material 216 to bond or hold the various electrode components together. For example, according to an exemplary embodiment, the layer of coating material may include a conductive additive such as carbon black and a binder such as polyvinylidine fluoride (PVDF) or an elastomeric polymer. A weight ratio of the carbon 216 to the binder may be in a range of about 2:3 to about 3:2. In some cases, the weight ratio of the carbon 216 to the binder may be about 1:1.

The negative electrode 220 includes a current collector 222 that is made of a conductive material such as a metal. According to an exemplary embodiment, the current collector 222 is aluminum or an aluminum alloy. One advantageous feature of utilizing an aluminum or aluminum alloy current collector is that Such a material is relatively inexpensive and may be relatively easily formed into a current collector. Other advantageous features of using aluminum or an aluminum alloy includes the fact that such materials may have a relatively low density, are relatively highly conductive, are readily weldable, corrosion resistant, and are generally commercially available. According to another exemplary embodiment, one or both of the positive current collector 212 and the negative current collector 222 is titanium or a titanium alloy.

While the positive current collector 212 and/or the negative current collector 222 has been illustrated and described as being a thin foil material, the positive and/or the negative current collector may have any of a variety of other configurations according to various exemplary embodiments. For example, the one or both of the positive current collector and the negative current collector may be a grid such as a mesh grid, an expanded metal grid, a photochemically etched grid, a metallized polymer film, or the like.

The negative current collector 222 has an active material 224 provided thereon. While FIG. 2 shows that the active material 224 is provided on only one side of the current collector 222, it should be understood that a layer of active material similar or identical to that shown may be provided or coated on both sides of the current collector 222. According to an exemplary embodiment, the active material 224 is lithium titanate ($Li_4Ti_5O_{12}$). According exemplary embodiments, the active material may be provided as one or more additional materials. According to various implementations, materials similar to $Li_4Ti_5O_{12}$ may be used that have Li ion intercalation potential at least 0.5V above Li metal. For example, Zr, Ti, Nb, W, V oxide or compounds that can function as the host of Li ion may be used. Specific exemples are $ZrO_2$, $TiO_2$, $Nb_2O_5$, $WO_3$, $V_2O_5$, $Li_4Ti_5O_{12}$, $TiNb_2O_7$, $Ti_2Nb_2O_9$, $Ti_2Nb_{10}O_{29}$, $TiNb_6O_{17}$, $TiNb_{14}O_{37}$, $TiNb_{24}O_{62}$, $Nb_{16}W_5O_{53}$, and $Nb_{18}W_{16}O_{93}$ and so on. The purpose of using negative materials with relatively high Li ion interaction potential is to avoid Li plating during fast recharge. In addition, the optimization of $LiCoO_2$ positive electrode can be applied to conventional negative electrode using graphite, silicon, or tin or the mixture of them as active materials.

A binder material may also be utilized in conjunction with the layer of active material 224. For example, according to an exemplary embodiment, the layer of active material may include a binder such as polyvinylidine fluoride (PVDF) or an elastomeric polymer. The active material 224 may also include a conductive material Such as carbon (e.g., carbon black).

Recharge burden, especially taking a long time to charge the batteries, is one of the biggest challenges for the application of rechargeable lithium ion batteries. Typical recharging time is one to four hours to get full capacity, which is mainly limited by battery chemistry and battery design. It is one of big disadvantages of battery powered electrical vehicle vs. conventional vehicle powered by petroleum fuel. It leads to a lot of trouble for the customers of portable electronic devices when their devices run out of battery during travel, a conference, and/or during an active communication. It also brings a lot of burden for some patients who are using rechargeable implantable devices. Rechargeable batteries capable of five to ten minutes recharge to greater than 90% state-of-charge (SOC) may be used to relieve at least some of this burden.

Devices using rechargeable batteries in accordance with embodiments described herein can be used in a variety of applications. For example, the batteries described herein may be used in medical devices such as spinal cord stimulators. Batteries using this technology may be capable of being charged to full capacity in less than one hour. In some cases, the batteries described herein can be charged to greater than 90% state of charge (SOC) within 20 minutes.

In some cases, the batteries described herein can be charged to greater than 90% state of charge (SOC) within a range of about 5 minutes to 15 minutes.

In general, lower battery resistance lead to fast recharge capability of the battery. Rechargeable Li ion batteries using $LiCoO_2$ positive electrode typically have relatively higher energy density and thus extensive used in small portable electronic devices and medical devices. However, $LiCoO_2$ electrode is typically the dominant factor for battery resistance and its stability, especially when lithium titanate ($Li_4Ti_5O_{12}$) is used as negative electrode. Improving the $LiCoO_2$ positive electrode can lead to faster recharge capability.

One approach for creating a fast charging battery is to use electrodes created from ultra-small particles, typically submicron size and thin electrodes of low volumetric energy density. Embodiments described herein show that with a given lithium titanate (LTO) electrode, unexpected results described herein show that it is possible to modulate the power capability of the battery significantly by changing the electrode formulation without changing the particle size to sub-micron size or reducing the electrode thickness values significantly.

According to embodiments described herein, the particle size D50 of the LCO active material is in a range of about 10 μm to about 20 μm. In some cases, the particle size d50 of the active material is in a range of about 14.5 μm to about 17 μm. The LTO may include one or more of secondary particles having a size of about 6+/−2 um formed by sub-micrometer particles. Therefore, it is to be understood that charge capability can be increased without using small particle LCO when using sub-micron LTO.

Embodiments described herein involve $LiCoO_2$ electrodes enabling about 10 minutes recharge to greater than 90% SOC. The content of the conductive agent (e.g., carbon) and binder (e.g., PVDF) may be balanced to achieve a super-fast recharge capability. According to various configurations, a weight ratio of at least two different types of conductive agents may be balanced. For example, a weight ratio of graphite to carbon black may be balanced to achieve a desired recharge capability. For example, the weight ratio of graphite (e.g. synthetic graphite) to carbon black may be in a range of about 1:9 to about 9:1. In some cases, the weight ratio of graphite to carbon black is in a range of about 3:7 to about 7:3.

According to various configurations, the $LiCoO_2$ content in the positive electrode can have wide range from about 90% to about 98%. In some cases, the $LiCoO_2$ content is greater than or equal to about 95% to achieve a relatively high energy density. With such $LiCoO_2$ formulation, battery resistance stability is very stable, ensuring stable fast recharge capability of the battery over its service life.

According to various embodiments, a positive electrode is a coating material layer on both sides of the current collector (For example, Al foil and/or Ti foil). In some cases, there is at least a portion of the current collector where only one side is coated or both sides not coated according to specific battery design. The coating material layer may include one or more of active materials, conductive carbon, and/or a binder. For a positive electrode, active material may be a lithium-containing transition metal oxide and/or a mixture of multiple oxides. Conductive carbon may be graphite, carbon black and/or the mixture of both graphite and carbon black. Typical binder materials are polyvinylidene fluoride (PVDF) polymer or carboxymethyl cellulose-styrene-butadiene rubber (CMC-SRB) polymer. A good electrode should have good adhesion to the current collector ensuring not delaminating from the current collector during battery assembly and battery use. According to various configurations a battery with fast recharge capability compared to traditional rechargeable batteries is lower resistance and lower resistance growth rate not impacting the capacity stability over-time. A battery having high energy density and high fast recharge capability may have a positive electrode with high active material percentage in the coating material layer.

Typically, there is a tradeoff between battery energy density and power capability. High power can be achieved by having an electrode contain more conductive carbon. This may lead to less active material in the electrode thus lead to low energy density. To achieve higher energy density, high active material content in the electrode may be used. High active material content leads to not only higher amount of mass but also may lead to higher electrode density if same level of porosity is present in the electrode. This is because active material like $LiCoO_2$ has much higher true density than those inert materials like carbon and binder.

Figure 3:
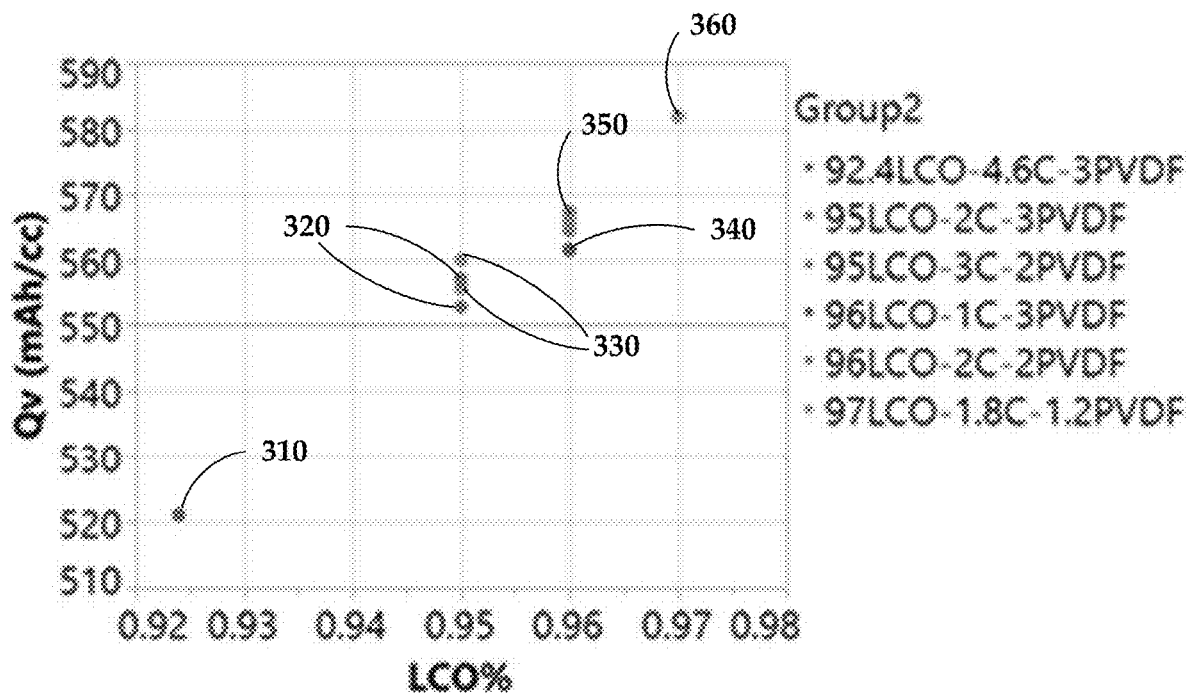
FIG. 3 shows volumetric capacity (Qv) of LCO electrode with different formulations in accordance with embodiments described herein.

FIG. 3 shows volumetric capacity (Qv) of LCO electrode with different formulations. As shown in FIG. 3, increasing $LiCoO_2$ content from 90.5% to 97% can be done without causing substantially different electrode porosity. Volumetric capacity of the positive electrode can be increased by about 20%. For $LiCoO_2$ electrode formulation, greater than or equal to about 95% $LiCoO_2$ may be desirable. According to various implementations, it may be desirable to have a Qv greater than about 550 mAh/cc as illustrated by line 370.

Figure 4:
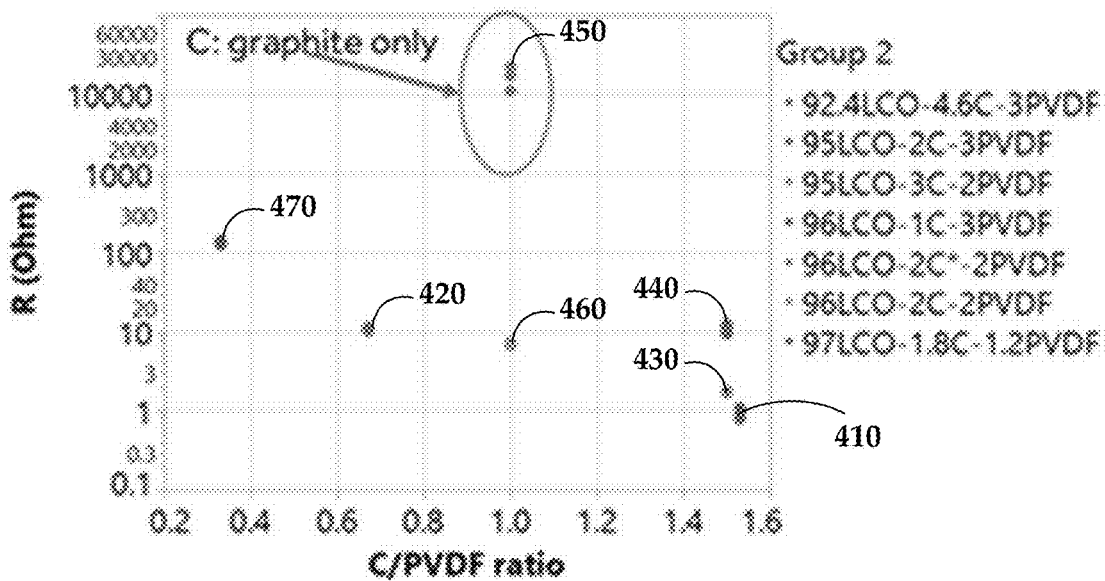
FIG. 4 shows dry electrode resistance of an 1 $cm^2$ double side coated electrode with different $LCoO_2$ electrode formulations in accordance with embodiments described herein.

Dry electrode resistance can be a quick screen parameter to check whether the electrode will lead to good kinetic properties of the battery. FIG. 4 shows dry electrode resistance of an 1 $cm^2$ double side coated electrode with different $LiCoO_2$ electrode formulations. As can be observed, the composition of conductive carbon plays a significant role. For example, with the similar formulation of 96% LCO-2% C-2% PVDF similar electrode thickness and electrode density, the dry resistance of the electrode with graphite only as conductive carbon is three magnitude higher than those with a mixture of carbon black and graphite. According to various implementations, the resistance is in a range of about 0 Ohm to about 100 Ohm. In some cases, the resistance is in a range of about 1 Ohm to about 10 Ohm.

Figure 5A:
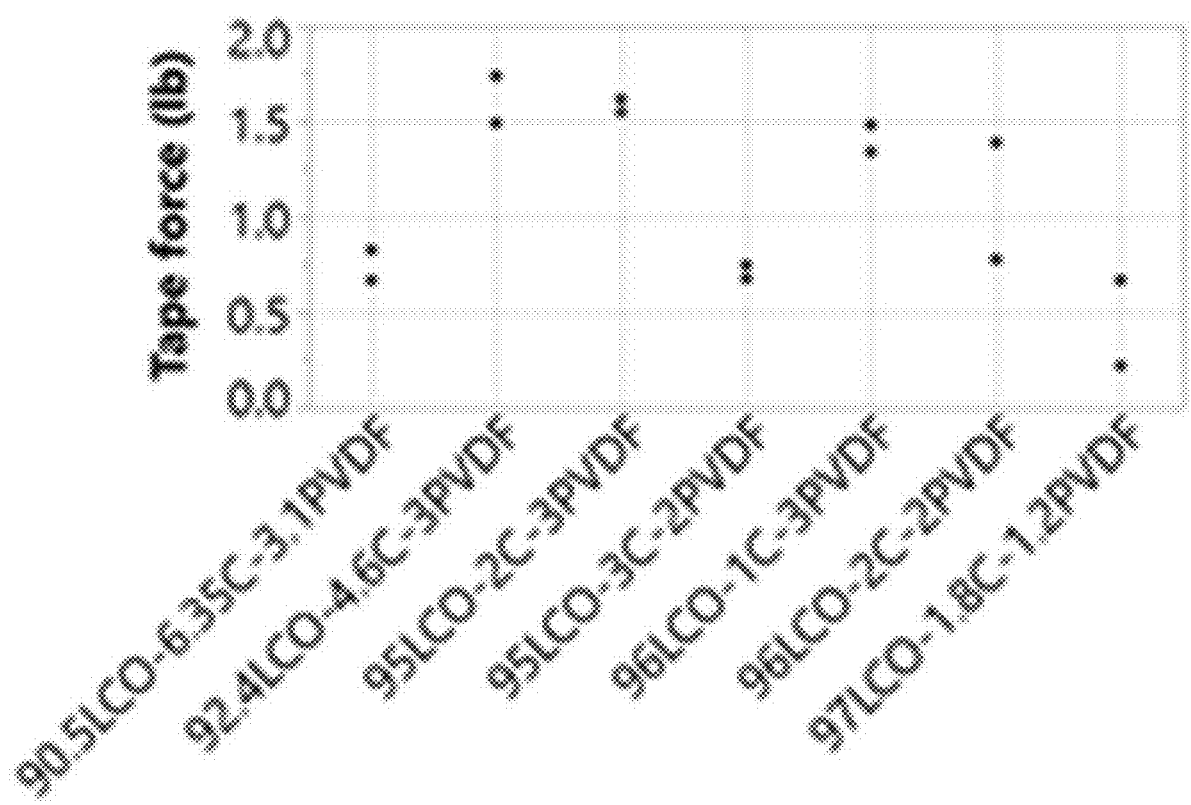
FIGS. 5A and 5B show the effect of electrode formulation on tape force and weight loss from tape in accordance with embodiments described herein.
Figure 5B:
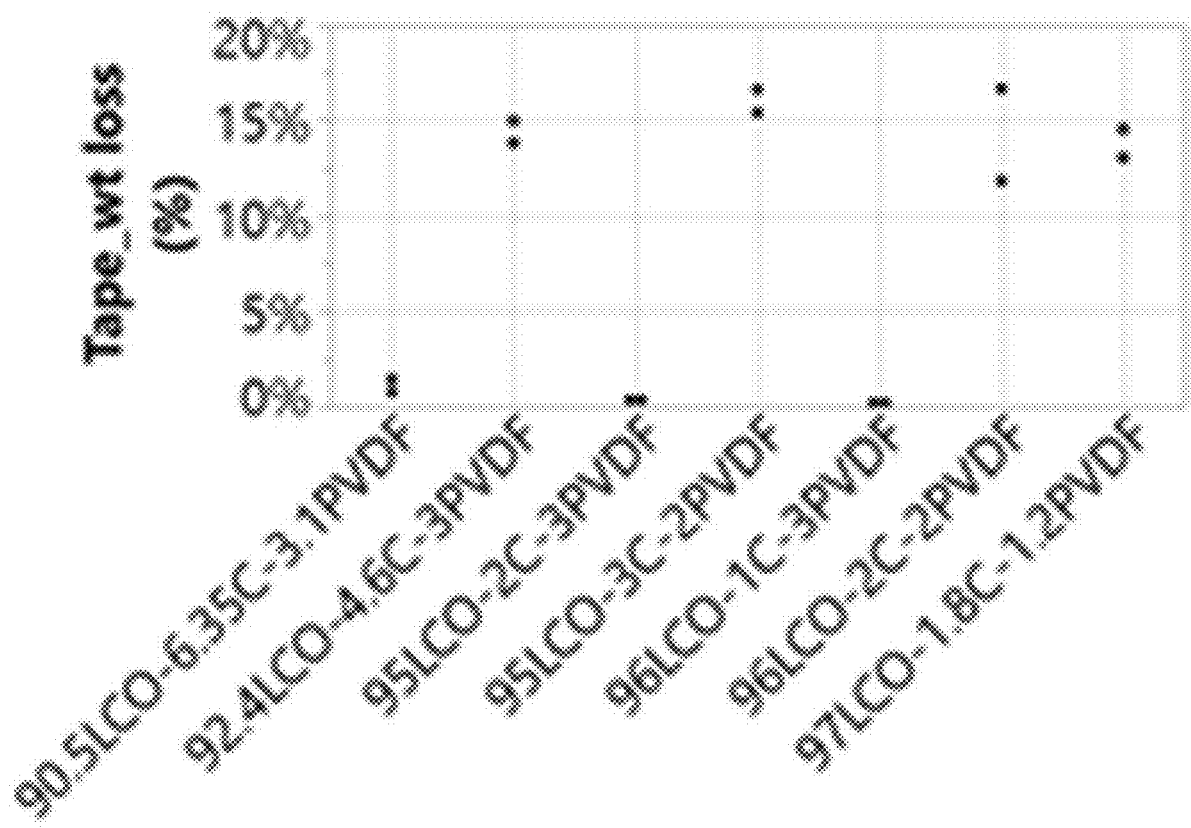

Mechanical properties of the electrode, especially the adhesion of the coating layer to the current collector, and/or the cohesion within the coating layer, may be useful in assembly and the long-term performance of the battery. A specific tape test can be used to evaluate the adhesion and cohesion of the electrode. Higher tape force (greater than 0.5 lb) and lower weight loss (less than 20%) may be desirable. FIGS. 5A and 5B show the effect of electrode formulation on tape force and weight loss from tape. As shown in FIGS. 5A and 5B both PVDF and carbon content have effect on tape force but PVDF content is the dominant factor on weight loss from the tape test. It can be observed that the tape force of the electrode with 1.2% PVDF content is so low that there may be a risk of an adhesion problem.

Figure 6A:
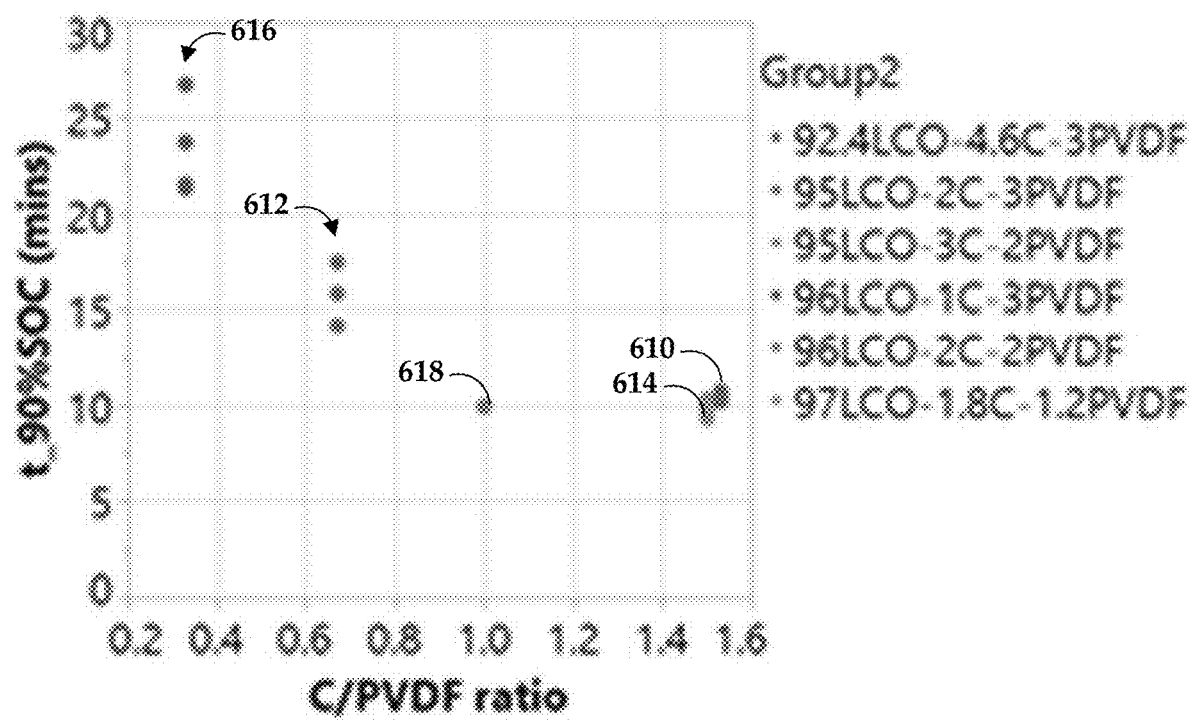
FIGS. 6A-6D show the effect of carbon and PVDF content on the electrical performance of a $Li_4Ti_5O_{12}/LiCoO_2$ cell in accordance with embodiments described herein.
Figure 6B:
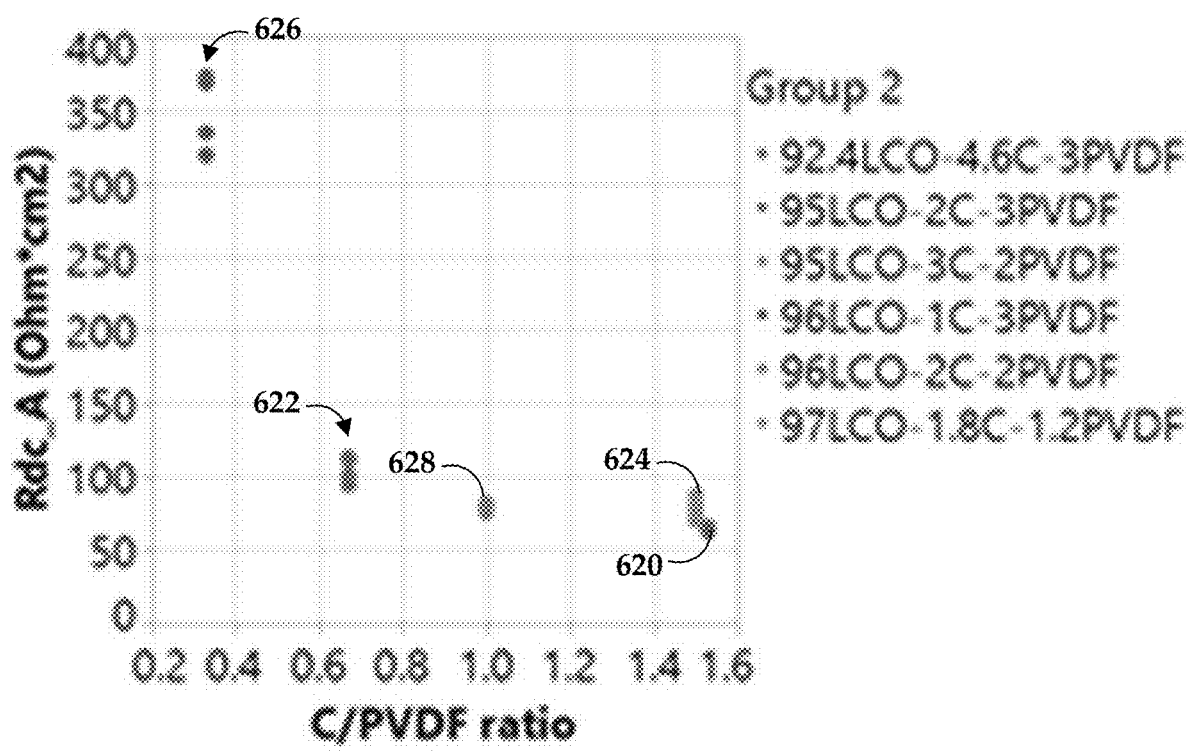
Figure 6C:
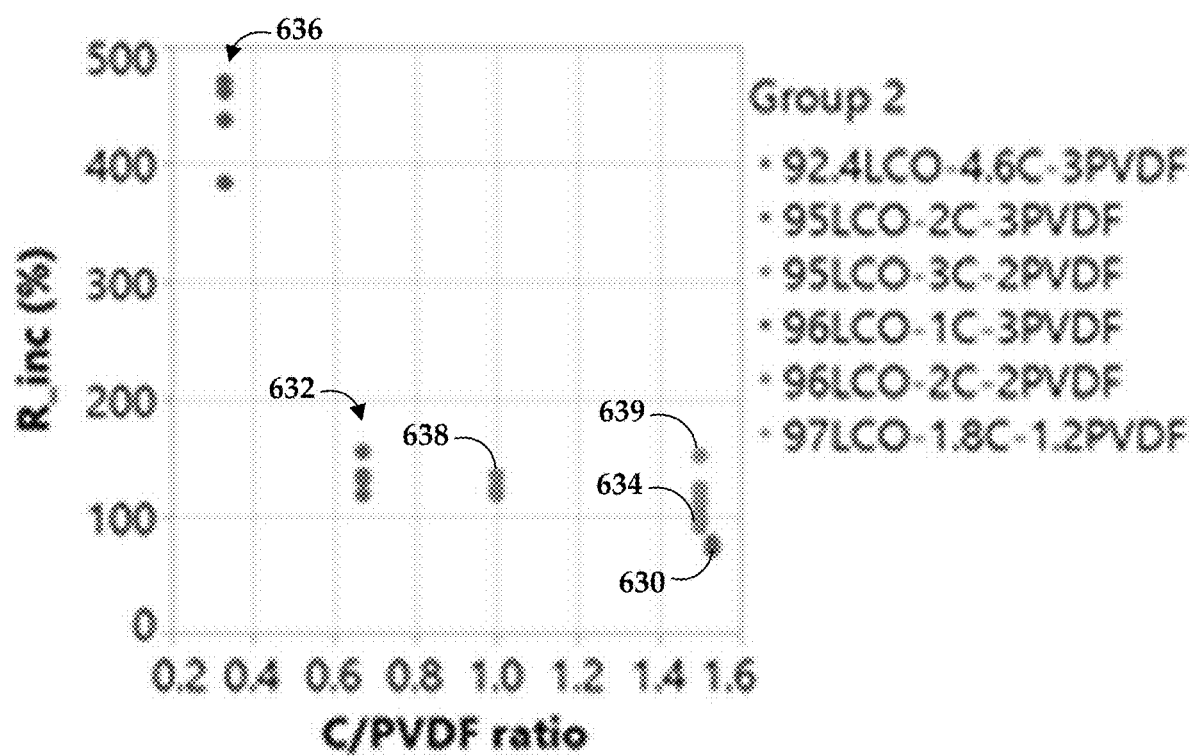
Figure 6D:
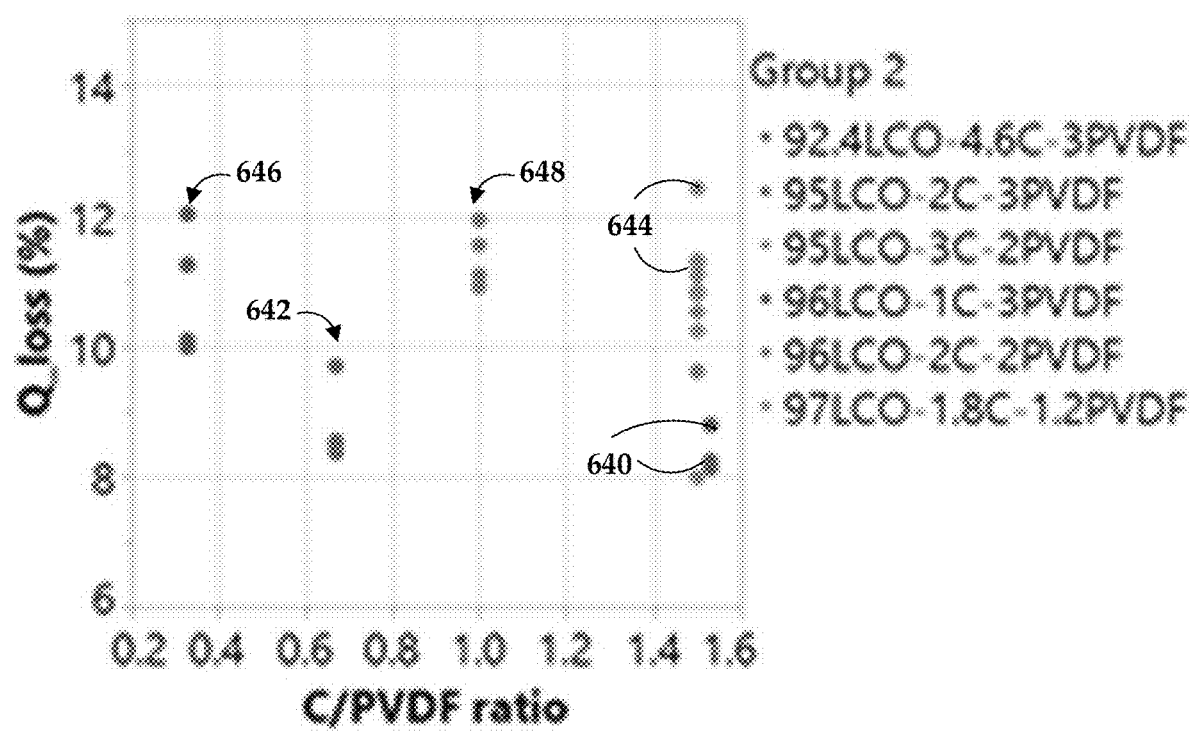

FIGS. 6A-6D show the effect of carbon and PVDF content on the electrical performance of a $Li_4Ti_5O_{12}/LiCoO_2$ cell. As shown in FIG. 6A, the weight ratio of C/PVDF has significant effect on the charge time to 90% SOC. With the increase of C/PVDF ratio, the charge time to 90% SOC decreases. As the ratio of C/PVDF greater than or equal to 1, it only takes about 10 minutes charge to get to 90% SOC. As shown in FIG. 6B, the ratio of C/PVDF has similar effect on the DC resistance of the battery to those of charge time to 90% SOC. With the increase of C/PVDF ratio, the DC resistance decreases. As shown FIG. 6C, the ratio of C/PVDF has similar effect on the stability of DC resistance of the battery. Higher C/PVDF ratio also leads to more stability of DC resistance over time. As shown in FIG. 6D, the ratio of C/PVDF has no substantially significant effect on the stability of battery capacity.

Figure 7:
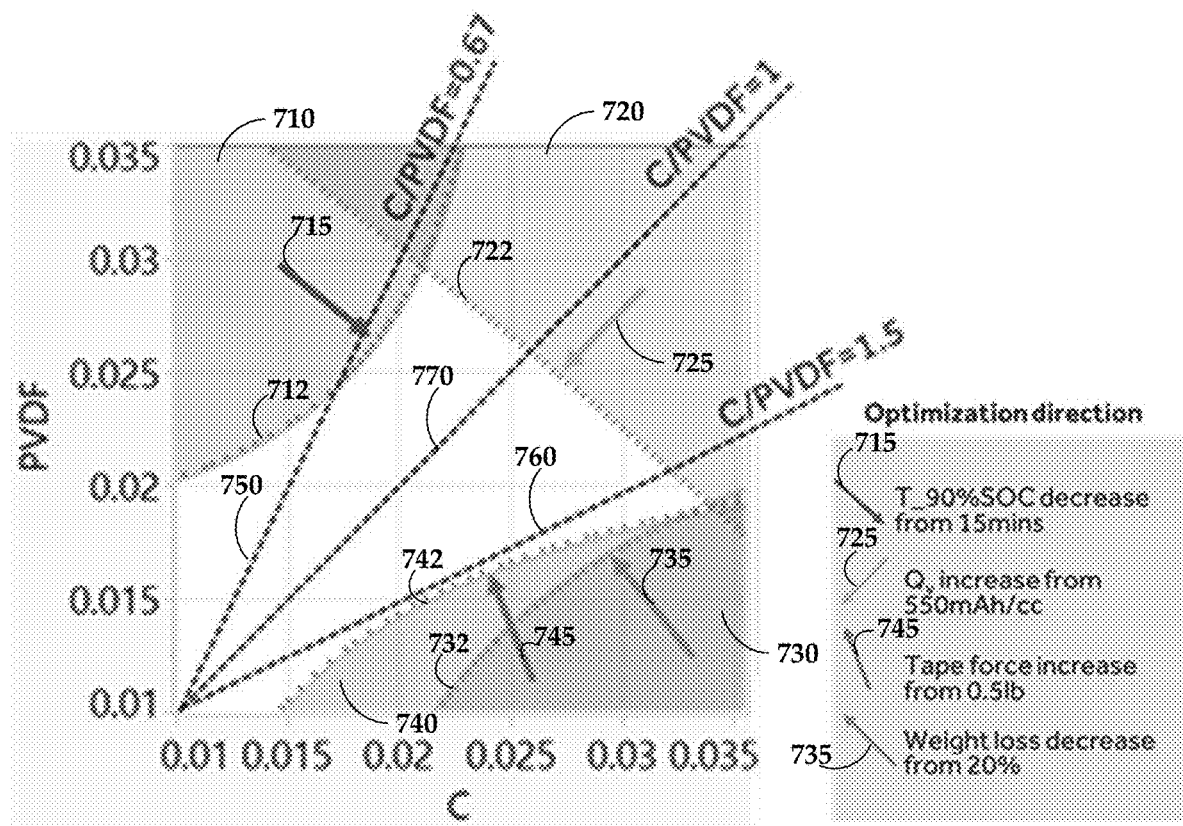
FIG. 7 shows a surface plot of four performance attributes in related to C and PVDF fraction in accordance with embodiments described herein.

A robust positive electrode to achieve fast rechargeability of the battery may also have good mechanical properties and higher energy density. It may involve electrode optimization with multiple responses. Each response may be a complex function of carbon content and PVDF content. FIG. 7 shows a surface plot of four performance attributes in related to C and PVDF fraction. As shown in FIG. 7, there is an optimal zone 705 (White zone) of C fraction and PVDF fraction in a LCO electrode to achieve desirable battery properties. According to various embodiments described herein the white area is represented by four inequalities that represent various target properties of the rechargeable battery as described in further detail below The desirable battery properties may include a fast recharge 710 (small time to get to about 90% SOC), where arrow 715 represents the optimization direction of the decrease of time to get to about 90% SOC from about 15 minutes. The battery properties may include a high energy density 720 (high Qv), where the arrow 725 represents the Qv increase from about 550 mAh/cc. The battery properties may include good electrode mechanical properties (low Wt_loss 730 and large Tape_force 740) where arrow 745 represents the increase in tape force from about 0.5 lb and arrow 735 represents the weight loss decrease from about 0.2%. The optimal white space is represented by equations (1), (2), (3), and (4) corresponding to curves 712, 722, 732, 742.

The curve 712 for the decrease of time to get to about 90% SOC from about 15 minutes is represented by (1).

$$12.5-362.6 \cdot C+356.1 \cdot PVDF \pm (C-0.020) \cdot ((PVDF-0.023) \cdot (-39629.6)) \quad (1)$$

The curve 722 for increase in LCO electrode volumetric capacity from about 550 mAh/cc is represented by (2).

$$623.34-1251.85 \cdot C-1577.78 \cdot PVDF+7407.41 \cdot (C-0.0195) \cdot ((PVDF-0.023)) \quad (2)$$

The curve 732 for weight loss decrease from about 0.2% is represented by (3).

$$0.164+4.82 \cdot C-8.47 \cdot PVDF-664.4 \cdot (C-0.0195) \cdot ((PVDF-0.023)) \quad (3)$$

The curve 742 for increase in tape force from about 0.5 lb is represented by (4).

$$-0.278-7.648 \cdot C+66.78 \cdot PVDF+623.34-1251.853592.59 \cdot (C-0.0195) \cdot ((PVDF-0.023)) \quad (4)$$

All scientific and technical terms used herein have meanings commonly used in the art unless otherwise specified. The definitions provided herein are to facilitate understanding of certain terms used frequently herein and are not meant to limit the scope of the present disclosure.

As used herein, singular forms "a," "an" and "the" include plural referents unless the context clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the inventive technology.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A rechargeable lithium-ion battery comprising:
    a negative electrode comprising a first active material comprising $Li_4Ti_5O_{12}$;
    a positive electrode comprising:
        a second active material comprising $LiCoO_2$, wherein a content of the $LiCoO_2$ is in a range of about 96% to about 98% of a weight of the positive electrode;
        a carbon conductive agent; and
        a binder, wherein a weight ratio of the carbon conductive agent to the binder is characterized by the positive electrode having a volumetric capacity in a range of about 550 mAh/cc to about 570 mAh/cc.

2. The rechargeable lithium-ion battery of claim 1, wherein the carbon conductive agent is a mixture of carbon black and graphite.

3. The rechargeable lithium-ion battery of claim 2, wherein a weight ratio of carbon black to graphite is in a range of about 1:9 to about 9:1.

4. The rechargeable lithium-ion battery of claim 2, wherein a weight ratio of carbon black to graphite is in a range of about 3:7 to about 7:3.

5. The rechargeable lithium-ion battery of claim 1, wherein a weight ratio of the carbon conductive agent to the binder is in a range of about 1:1 to about 3:2.

6. The rechargeable lithium-ion battery of claim 1, wherein the binder comprises PVDF.

7. The rechargeable lithium-ion battery of claim 1, wherein the weight ratio of the carbon conductive agent to the binder is further characterized by the positive electrode having a dry resistance in a range of about 1 Ohm to about 10 Ohms.

8. The rechargeable lithium-ion battery of claim 1, wherein the rechargeable lithium-ion battery can be charged to at least 90% state of charge in a range of about 5 minutes to about 15 minutes.

9. A rechargeable lithium-ion battery comprising:
    a negative electrode comprising a first active material comprising $Li_4Ti_5O_{12}$; and
    a positive electrode comprising:
        a second active material comprising $LiCoO_2$, wherein a content of the $LiCoO_2$ is in a range of about 96% to about 98% of a weight of the positive electrode;
        a carbon conductive agent comprising a weight ratio of carbon black and graphite in a range of about 1:9 to about 9:1; and
        a binder, wherein a weight ratio of the carbon conductive agent to the binder is characterized by the positive electrode having a dry resistance in a range of about 1 Ohm to about 100 Ohms.

10. The rechargeable lithium-ion battery of claim 9, wherein a weight ratio of the carbon conductive agent to the binder is in a range of about 1:1 to about 3:2.

11. The rechargeable lithium-ion battery of claim 9, wherein the binder comprises PVDF.

12. The rechargeable lithium-ion battery of claim 9, wherein the positive electrode has a volumetric capacity in a range of about 550 mAh/cc to about 570 mAh/cc.

13. The rechargeable lithium-ion battery of claim 9, the weight ratio of the carbon conductive agent to the binder is characterized by the positive electrode having a dry resistance in a range of about 1 Ohm to about 10 Ohms.

14. The rechargeable lithium-ion battery of claim 9, wherein the rechargeable lithium-ion battery can be charged to at least 90% state of charge in a range of about 5 minutes to about 15 minutes.

15. A rechargeable lithium-ion battery comprising:
    a negative electrode comprising a first active material comprising $Li_4Ti_5O_{12}$;
    a positive electrode comprising:
        a second active material comprising $LiCoO_2$;
        a carbon conductive agent; and
        a binder, wherein a weight ratio of the carbon conductive agent, C, to the binder, PVDF is characterized by one or more of:

$$12.5 - 362.6 \cdot C + 356.1 \cdot PVDF + (C - 0.020) \cdot ((PVDF - 0.023) \cdot (-39629.6) < 15 (mins); \quad 1)$$

$$623.34 - 1251.85 \cdot C - 1577.78 \cdot PVDF + 7407.41 \cdot (C - 0.0195) \cdot ((PVDF - 0.023) > 550 \ (mAh); \quad 2)$$

$$0.164 + 4.82 \cdot C - 8.47 \cdot PVDF - 664.4 \cdot (C - 0.0195) \cdot ((PVDF - 0.023) < 0.2 (\%); \text{ or} \quad 3)$$

$$-0.278 - 7.648 \cdot C + 66.78 \cdot PVDF + 623.34 - 1251.853592.59 \cdot (C - 0.0195) \cdot ((PVDF - 0.023) > 0.5 \ (lbs). \quad 4)$$

16. The rechargeable lithium-ion battery of claim 15, wherein the carbon conductive agent is a mixture of carbon black and graphite.

17. The rechargeable lithium-ion battery of claim 15, wherein the positive electrode has a dry resistance in a range of about 1 Ohm to about 10 Ohms.

18. The rechargeable lithium-ion battery of claim 15, wherein the positive electrode comprises a $LiCoO_2$ weight content in a range of about 95% to about 98%.

* * * * *